(12) United States Patent
Toren

(10) Patent No.: US 12,034,688 B1
(45) Date of Patent: Jul. 9, 2024

(54) MACHINE LEARNING OF USER BEHAVIOR FOR MESSAGE PLAYBACK

(71) Applicant: messageLOUD Inc., Tenafly, CA (US)

(72) Inventor: Garin Toren, Tenafly, NJ (US)

(73) Assignee: messageLOUD Inc., Tenafly, NJ (US)

( * ) Notice: Subject to any disclaimer, the term of this patent is extended or adjusted under 35 U.S.C. 154(b) by 0 days.

(21) Appl. No.: 18/209,948

(22) Filed: Jun. 14, 2023

Related U.S. Application Data

(60) Provisional application No. 63/419,286, filed on Oct. 25, 2022.

(51) Int. Cl.
*H04L 51/212* (2022.01)
*G06N 5/025* (2023.01)

(52) U.S. Cl.
CPC .......... *H04L 51/212* (2022.05); *G06N 5/025* (2013.01)

(58) Field of Classification Search
CPC .............................. H04L 51/212; G06N 5/025
See application file for complete search history.

(56) References Cited

U.S. PATENT DOCUMENTS

| 11,531,950 | B2* | 12/2022 | Sella | G06Q 10/063118 |
| 2007/0133757 | A1* | 6/2007 | Girouard | H04M 3/436 |
| | | | | 379/67.1 |
| 2011/0222673 | A1* | 9/2011 | Piemonte | H04M 1/656 |
| | | | | 379/88.12 |
| 2019/0297040 | A1* | 9/2019 | White | H04L 51/08 |
| 2019/0340580 | A1* | 11/2019 | Bentley | H04L 51/216 |
| 2021/0400008 | A1* | 12/2021 | Khan | H04L 51/066 |
| 2023/0066403 | A1* | 3/2023 | Matsuoka | H04L 51/234 |

* cited by examiner

*Primary Examiner* — Alina A Boutah
(74) *Attorney, Agent, or Firm* — Payam Moradian

(57) ABSTRACT

Playback of messages received by a user of an electronic device may be based on analysis of the user's behavior, such as by a machine learning algorithm. Historical data associated with messages received by the user may be filtered based on a first parameter of the historical data. A second parameter may be selected from the historical data and compared to all the other parameters of the historical data. A respective correlation coefficient for the second parameter with respect to each of the other parameters of the historical data may be determined based on the comparing and a third parameter may be selected from the historical data based on the respective correlation coefficients. Data points associated with the second and third parameters may be extracted from the historical data and a recommendation for playback of a message may be generated based on the parameters and the extracted data points.

18 Claims, 4 Drawing Sheets

MACHINE LEARNING BEHAVIORAL ANALYSIS

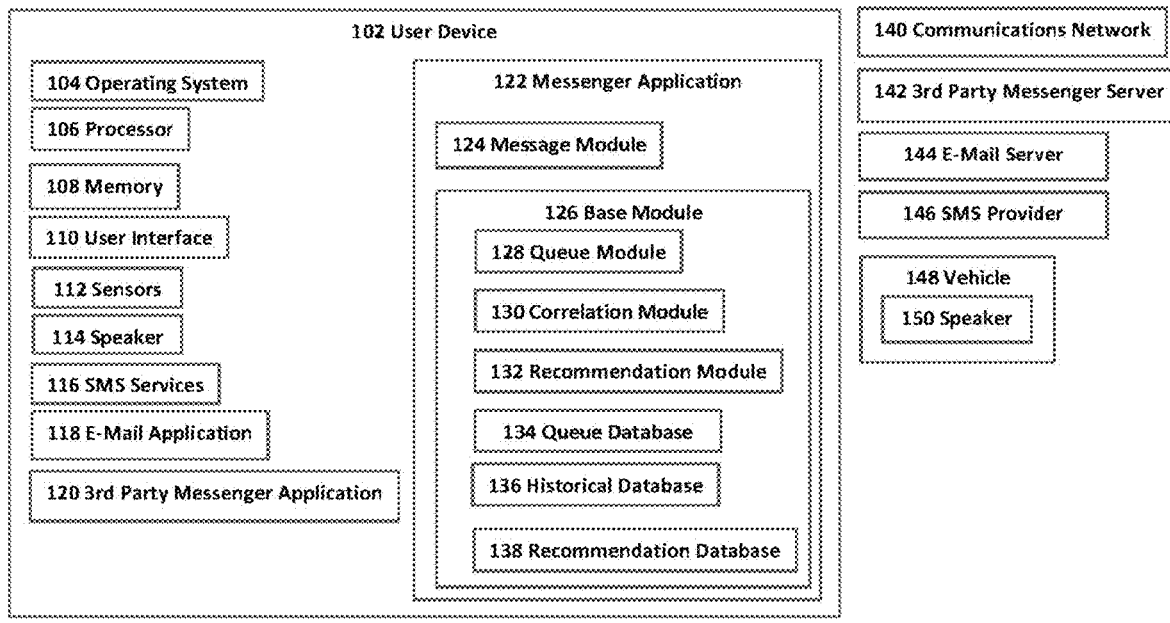
FIG.1 MACHINE LEARNING BEHAVIORAL ANALYSIS
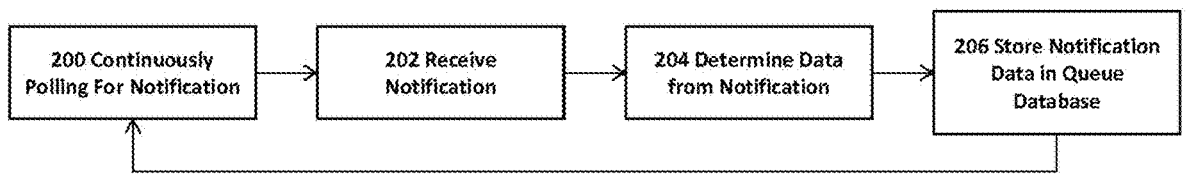
FIG.2 MESSAGE MODULE
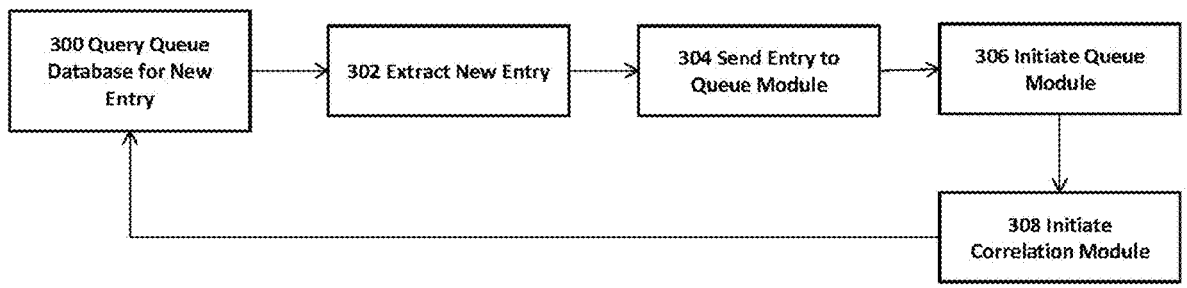
FIG.3 BASE MODULE

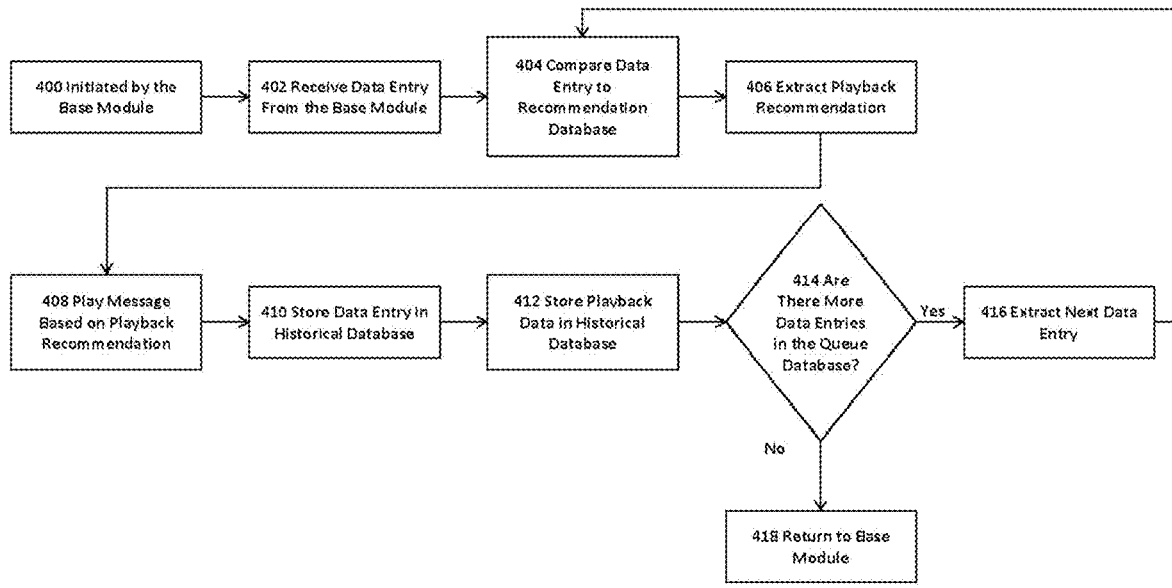
FIG.4 QUEUE MODULE
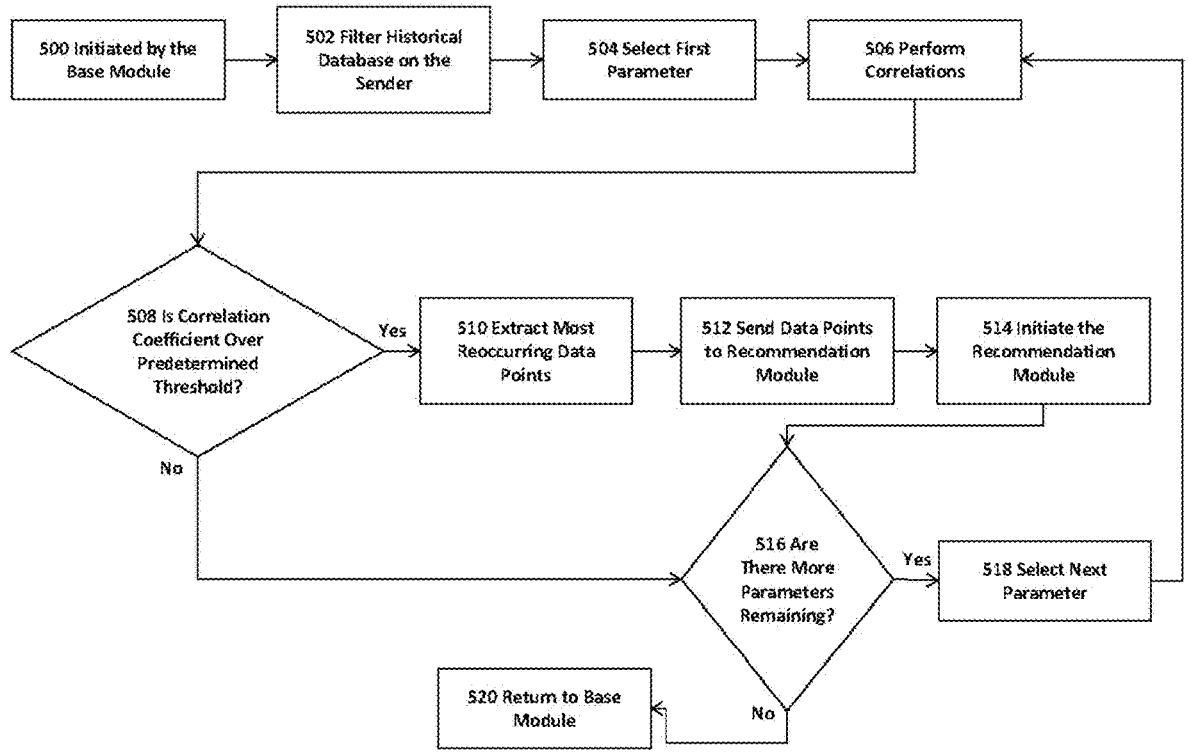
FIG.5 CORRELATION MODULE

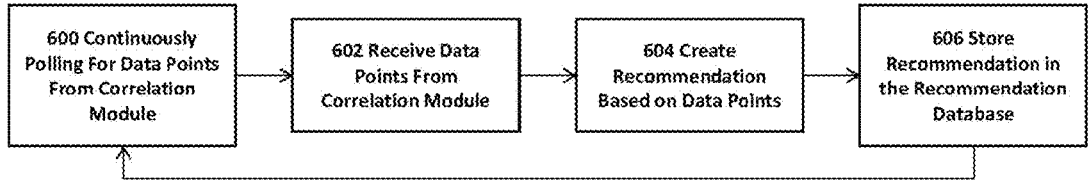

FIG.6 RECOMMENDATION MODULE

| Date | Time | Sender | Relationship | Type | Message | Audio File | Audio Length |
|---|---|---|---|---|---|---|---|
| 10/6/2022 | 8:30am | Jane Smith | Family | Text Message | "Your brother can take your daughter to dance lessons after school today" | message7895.mp3 | 6 seconds |
| 10/6/2022 | 9:01am | Thomas Johnson | Professional | E-Mail | "The client can discuss the project today at 11:00am" | message7896.mp3 | 5 seconds |
| 10/6/2022 | 9:05am | Greg Smith | Family | Text Message | "Hey bro, I'm going to take your daughter to dance lessons today after school. I'm planning on taking her for ice cream at the Dairy Queen afterwards but will have her back home by 4:00pm so she can finish her homework" | message7897.mp3 | 19 seconds |
| . | . | . | . | . | . | . | . |
| . | . | . | . | . | . | . | . |
| . | . | . | . | . | . | . | . |

FIG.7 QUEUE DATABASE

| Date | Time | Sender | Relationship | Type | Message | Audio File | Audio Length | Listen Time | Percent Listened | Number of Relationship Words | Times Skipped | Time Between Received and Played |
|---|---|---|---|---|---|---|---|---|---|---|---|---|
| 10/6/2022 | 8:30am | Jane Smith | Family | Text Message | "Your brother can take your daughter to dance lessons after school today" | message7895.mp3 | 6 seconds | 6 seconds | 100% | 3 | 0 | 2 minutes |
| 10/6/2022 | 9:01am | Thomas Johnson | Professional | E-Mail | "The client can discuss the project today at 11:00am" | message7896.mp3 | 5 seconds | 5 seconds | 100% | 3 | 0 | 1 minute |
| 10/6/2022 | 9:05am | Greg Smith | Family | Text Message | "Hey bro, I'm going to take your daughter to dance lessons today after school. I'm planning on taking her for ice cream at the Dairy Queen afterwards but will have her back home by 4:00pm so she can finish her homework" | message7897.mp3 | 19 seconds | 10 seconds | 53% | 6 | 2 | 1 hour |
| . | . | . | . | . | . | . | . | . | . | . | . | . |
| . | . | . | . | . | . | . | . | . | . | . | . | . |
| . | . | . | . | . | . | . | . | . | . | . | . | . |

FIG.8 HISTORICAL DATABASE

| Parameter | First Data Point | Second Data Point | Correlation Coefficient | Recommendation |
|---|---|---|---|---|
| Sender Jane Smith | Message Time | Listen Time | 0.98 | When Sender is Jane Smith Play Entire Message |
| Time Work Hours | Work Relationship Words in Message | Listen Time | 0.95 | During Work Hours Play Entire Message if Sender Relationship is Professional |
| Time Non Work Hours | Work Relationship Words in Message | Number of Times Skipped | 0.92 | During Non Work Hours Prioritize Senders with Family and Friend Relationships Over Professional Relationship |
| . | . | . | . | . |
| . | . | . | . | . |
| . | . | . | . | . |

FIG.9 RECOMMENDATION DATABASE

MACHINE LEARNING OF USER BEHAVIOR FOR MESSAGE PLAYBACK

CROSS-REFERENCE

The present application claims the benefit of U.S. provisional application No. 63/419,286, filed on Oct. 25, 2022, which is incorporated herein by reference in its entirety.

FIELD OF THE DISCLOSURE

The present disclosure is generally related to utilizing machine learning to determine user behaviors regarding playback of messages or notifications.

BACKGROUND

Currently, an issue with mobile devices is the amount of messages (or other electronic information) a user receives on a daily basis through various communication channels, such as text messages, e-mails, and social media messages. Furthermore, the user may also be engaged in other activities that prohibit them from reading or checking all of their messages from all the communication channels and it may be difficult to prioritize (e.g., select) messages from various senders and from various communication channels for playback.

Still further, the user may not have the time or the ability to read all of the messages at one time and therefore the messages may need to be filtered and prioritized based upon the user's preferences before they are read. Therefore, it may be useful to have methods/systems capable of using machine learning for user behavioral analysis to play and prioritize messages and/or notifications.

DESCRIPTIONS OF THE DRAWINGS

FIG. 1: Illustrates a method for machine learning behavioral analysis, according to an embodiment.

FIG. 2: Illustrates a Message Module, according to an embodiment.

FIG. 3: Illustrates a Base Module, according to an embodiment.

FIG. 4: Illustrates a Queue Module, according to an embodiment.

FIG. 5: Illustrates a Correlation Module, according to an embodiment.

FIG. 6: Illustrates a Recommendation Module, according to an embodiment.

FIG. 7: Illustrates a Queue Database, according to an embodiment.

FIG. 8: Illustrates a Historical Database, according to an embodiment.

FIG. 9: Illustrates a Recommendation Database, according to an embodiment.

DETAILED DESCRIPTION

Embodiments of the present disclosure will be described more fully hereinafter with reference to the accompanying drawings in which like numerals represent like elements throughout the several figures, and in which example embodiments are shown. The claims may, however, be embodied in many different forms and should not be construed as limited to the embodiments set forth herein. The examples set forth herein are non-limiting examples and are merely examples among other possible examples.

Described herein are systems and methods for using machine learning to analyze user behavior regarding received messages. As shown in FIG. 1, a user may receive electronic messages with a user device 102 (e.g., an electronic device) such as a laptop, smartphone, table, computer, or smart speaker. Some embodiments may include an operating system 104 that may be a system software that manages computer hardware, software resources, and provides common services for computer programs. Time-sharing operating systems may schedule tasks for efficient use of the system and may also include accounting software for cost allocation of processor time, mass storage, printing, and/or other resources. For hardware functions such as input and output and memory allocation, the operating system 104 may act as an intermediary between programs and the computer hardware, although the application code will usually be executed directly by the hardware and may frequently make system calls to an OS function or be interrupted by it. Some embodiments may include a processor 106 which may be configured to decode and execute any instructions received from one or more other electronic devices or server(s). The processor may include one or more general-purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 106 may be configured to execute one or more computer-readable program instructions, such as program instructions to carry out any of the functions described in this description. Some embodiments may include a memory 108 which may include, but is not limited to, fixed (hard) drives, magnetic tape, floppy diskettes, optical disks. Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs). Electrically Erasable PROMs (EEPROMs), flash memory, magnetic or optical cards, or other type of media/machine-readable medium suitable for storing electronic instructions. The memory 108 may comprise modules implemented as a program or programs. Some embodiments may include a user interface 110 which may either accept inputs from users or provide outputs to the users or may perform both the actions. For example, the user can interact with the user interface(s) 110 using one or more user-interactive objects and devices such as user input buttons, switches, knobs, levers, keys, trackballs, touchpads, cameras, microphones, motion sensors, heat sensors, inertial sensors, touch sensors, or a combination of the above. Furthermore, the user interface(s) 110 may either be implemented as a Command Line Interface (CLI), a Graphical User Interface (GUI), a voice interface, or a web-based user-interface.

Some embodiments may include a plurality of sensors 112 that may be used such as motion sensors, temperature sensors, humidity sensors, cameras, microphones, radiofrequency receiver, a thermal imager, a radar device, a lidar device, a speaker, wearable devices etc. Some embodiments may include a speaker 114 which is a type of electroacoustic transducer, such as a device that converts an electrical audio signal into a corresponding sound. A speaker system comprises one or more such speaker drivers, an enclosure, and electrical connections possibly including a crossover network. The speaker driver can be viewed as a linear motor attached to a diaphragm which couples that motor's movement to motion of air, that is, sound. An audio signal, typically from a microphone, recording, or radio broadcast, is amplified electronically to a power level capable of driving that motor in order to reproduce the sound corresponding to the original unamplified electronic signal. Some embodiments may include SMS services 116 which are a text messaging service component of most telephone, Internet, and mobile device systems. The SMS services 116 may use standardized communication protocols that let mobile devices exchange short text messages. An intermediary service can facilitate a text-to-voice conversion to be sent to landlines. In some embodiments, the SMS services 116 may provide text messaging which is the act of sending short, alphanumeric communications between cellphones, pagers or other hand-held devices, as implemented by a wireless carrier. Some embodiments may include E-mail application 118 which is a program that features and functionality for using electronic mail. In most cases, these programs are not actual email hosting technologies, but rather, email editors with different formats, layout and messaging functionality tools. For example, the Microsoft Outlook email application supports a lot of the business email traffic that happens in Windows operating system environments. Like other email software applications, it presents its own delivery interface with features like multi-line viewing and different kinds of filtering and folder utilities.

Some embodiments may include 3rd party messenger applications 120 which allow users to communicate with one another inside the application. The 3rd party messenger applications 120 may provide the user with a higher degree of customization and feature group chat functionalities, media sharing capabilities, and make video calls and send audio file messages. Some embodiments may include a messenger application 122 which receives, processes, and delivers emails from an e-mail application 118, text messages from an SMS service 116, and messages from a 3rd party messenger application 120 to a user. The emails, text messages, and messages from a 3rd party messenger application 120 may arrive at the user device 102 through a communication network 138. The messenger application 122 checks for new emails. The incoming SMS service 116 that is typically part of the operating system 104 receives text messages delivered from to the user device 102 or other device from the communication network 138. The user device 102 operating system 104 delivers the messages to the default SMS application, after which an SMS message is sent to the user. The messenger application 122 can have a message listener that checks for new text messages. In the same manner as text messages, messages from a 3rd party messenger application 120 are delivered through a communication network 138 to the user device 102. A 3rd party messenger application 120 message listener receives the 3rd party messenger application 120 message and can send a notification of the 3rd party messenger application 120 message. New (e.g., unread/unviewed) text messages, emails, and messages from 3rd party messenger application 120 can be placed in a queue database 136. When a message rises to the front of the queue 136 (e.g., it is the next message in the queue 136), the message queue 136 dispatches the message to all observers.

New text messages, emails, and messages from 3rd party messenger applications 120 can be processed by parsing and analyzing the message content and/or any message meta data in order to extract relevant information. A first determination can be made as to which message type is received, such as email, text message, and 3rd party messenger application 120 message. The message type can then be parsed according to sender, body, time received, data received, etc. If the messenger application 122 determines that the email or the text message needs to be read to the user, then the application carries out text to speech conversion. For example, the messenger application 122 can create a transcript of the portions or all of the message that it has processed, and covert the message to an audio file using TTS (text-to-speech) libraries. The audio file can be stored in a default storage area of the user device 102. Typically, the messenger application 122 audio file is then played on the user device 102 speaker 114, and then the audio is terminated either by an action of the user or after completion. When the messenger application 122 processes the email or the text message, the messenger application 122 can prompt the user on the screen to take certain actions, including calling back the sender, dismissing the message, and pausing audio. The user's inputs, such as swipes on the screen, are processed and further action may be taken by the messenger application 122 based on the user input. For example, the user input can stop the messenger application 122 from playing the audio. If the user selects call back sender, the user device 102 native application for calling makes the requested phone call. If a user dismisses a message, the email may be marked as unread by the e-mail application 118. The speech to text conversion and the user prompts may happen simultaneously after processing the message. Processing and/or analyzing the message may be repeated based on the user's input (e.g., request to be reminded) or after a delay afforded to the user (e.g. next day). Playing of the audio can occur on the user device 102 speaker 114, or on a speaker of a networked device, for example a vehicle 146 speaker 148 that is connected with Bluetooth.

In some embodiments, the messenger application 122 runs on the user device 102. In some embodiments, an external server in communication with the user device 102 in which the messenger application 122 resides can control a user's account, gather data, and carry out other administrative tasks. In some embodiments the communication network 138 may be that of a mobile carrier or an internet carrier (network). In some embodiments, Internet Message Access Protocol (IMAP) can be used as an Application Layer Internet protocol to communicate with a remote mail server to access email. In some embodiments, text messages may be communicated, for example, through the user's mobile carrier service. In some embodiments, Short Message Service (SMS) may use standardized communications protocols to allow mobile phone and user user device 102 to exchange short text messages. In some embodiments, the text message can be limited to a number of characters. In some embodiments, the message type can be one from a 3rd party messenger application 120 service such as Facebook messenger, WhatsApp messenger. Skype messenger, Twitter Direct Messenger, Tango messenger, Viber Messenger, WeChat messenger, Instagram direct messenger, and iMessage (Apple chat). In some embodiments, a messenger is an instant messaging service and software application which provides chat with a friend on devices that may include the user device 102, such as a mobile phone.

Some embodiments may include a message module 124 which begins by continuously polling for a message/notification. The message module 124 receives a notification and determines the data from the notification. The message module 124 stores the notification data in the queue database 134. Furthermore, embodiments may include a base module 126 which begins by sending a query to the queue database 134 for a new data entry. The base module 126 extracts the new entry from the queue database 134. The base module 126 sends the extracted new entry to the queue module 128. The base module 126 initiates the queue module 128. The base module 126 initiates the correlation module 130. Furthermore, embodiments may include a queue module 128 which begins by being initiated by the base module 126. The queue module 128 receives the data entry from the base module 126. The queue module 128 compares the data entry to the recommendation database 138. The queue module 128 extracts the playback recommendation from the recommendation database 138. The queue module 128 plays the message from the data entry based upon the playback recommendation from the recommendation database 138. The queue module 128 stores the data entry in the historical database 136. The queue module 128 stores the playback data in the historical database 136. The queue module 128 determines if there are more data entries stored in the queue database 134. If it is determined that there are more data entries in the queue database 134 the queue module 128 extracts the next data entry and the process returns to comparing the extracted data entry to the recommendation database 138. If it is determined that there are no more data entries remaining in the queue database 134 the queue module 128 returns to the base module 126.

In some embodiments a correlation module 130 may begin by being initiated by the base module 126. The correlation module 130 filters the historical database 136 on the sender. Then the correlation module 130 selects the first parameter in the historical database 136. The correlation module 130 performs correlations on the selected parameter and the remaining parameters to determine if the parameters are highly correlated. The correlation module 130 determines if the correlation coefficient is over the predetermined threshold, for example over a correlation coefficient of 0.75. If it is determined that the correlation coefficient is over the predetermined threshold then the correlation module 130 extracts the most reoccurring data point from the data set. The correlation module 130 then sends the most reoccurring data point to the recommendation module 132. The correlation module 130 initiates the recommendation module 132. If it is determined that the correlation coefficient is not over the predetermined threshold or after the most reoccurring data point is sent to the recommendation module 132 the correlation module 130 determines if there are more parameters remaining in the historical database 136. If it is determined that there are more parameters remaining in the historical database 136 the correlation module 130 selects the next parameter in the historical database 136 and the process returns to performing correlations on the parameters. If it is determined that there are no more parameters remaining in the historical database 136 the correlation module 130 returns to the base module 126.

In some embodiments a recommendation module 132 may begin by continuously polling for the data points from the correlation module 130. The recommendation module 132 receives the data points from the correlation module 130 and creates a recommendation based upon the received data points. The recommendation module 132 stores the created recommendation in the recommendation database 138. Further, embodiments may include a queue database 134 which contains the messages or notifications in queue to be played by the messenger application 122 for the user. The database is created through the process described in the message module 124 in which once the message is received by the messenger application 122 the message module 124 collects and determines the data about the message and stores the data in the queue database 134. The database contains the date the message is received, the time the message was received, the sender of the message, the sender's relationship to the user, the type of message that was received, the body of the message, an audio file containing the data to play the message, and the length of the audio file. In some embodiments, the queue database 134 may be updated by the queue module 128 based on a recommendation extracted from the recommendation database 138, such as giving a message a lower or higher priority over other messages, placing the message data entry in a lower or higher position in the queue database 134, skipping a message to get to another message, prioritizing specific senders or senders with specific relationships to the user depending on the current time.

In some embodiments a historical database 136 may be created in the process described in the queue module 128 in which the data extracted from the queue database 134 and the data collected from the user's playback of the message are stored in the historical database 136. The database is used in the correlation module 130 to determine if there are correlations between the various parameters and if so, the correlated parameters are used by the recommendation module 132 to create recommendations for future messages that are received by the messenger application 122. The database contains the date the message is received, the time the message was received, the sender of the message, the sender's relationship to the user, the type of message that was received, the body of the message, an audio file containing the data to play the message, the length of the audio file, the listen time of the message, the percentage of the message that was listened to by the user, the number of relationship words contained in the message, the number of times the message was skipped, the time elapsed between the message being received and the time the message was played by the user. Furthermore, the relationship words may be determined by comparing to the body of the message to a database that contains specific words related to the sender's relationship to the user, such as a family relationship, professional or work relationship, friend relationship, etc. For example, relationship words for a family relationship may be brother, sister, husband, wife, mother, father, daughter, son, grandfather, grandmother, grandfather, mother in law, father in law, etc. Also, family relationship words may be specific words normally used by a family member, such as dinner, supper, homework, school, home, lessons, appointment, babysitter, etc. For example, work relationship words may be client, project, schedule, meeting, boss, supervisor, employee, subordinate, assistant, discuss, plan, conference, deadline, invoice, etc.

In some embodiments, the work relationship words may be related to the type of employment for the user, for example, there may be specific words typically used by certain professions, such as doctor, nurse, or healthcare workers, lawyers, salespersons, marketing specialists, etc. For example, the friend relationship words may be double date, dinner, party, open house, get to together, game night, etc. In some embodiments, the relationship words may be selected by the user, or the messenger application may have a generic database that can be used in order to determine the usage of relationship words. Further, embodiments may include a recommendation database 138 which is created in the process described in the recommendation module 132 in which the recommendation module 132 uses the received data points and filtered parameter to determine a recommendation that will be used during the process described in the queue module 128 for incoming messages received by the messenger application 122. The database contains the received parameter and the first and second data point, the correlation coefficient of the data points, and the created recommendation. In some embodiments, the data points may be the most reoccurring data points in the correlated data set to determine the recommendation. Furthermore, the data points may be used to create the recommendations, such as if the user consistently listens to the entire message from their wife, such as a Jane Smith, the recommendation would be to play the entire message if the sender is Jane Smith. Also, if the message is received during work hours, such as 9 am through 5 pm, and the user consistently listens to the entire message if the message contains work relationship words the recommendation may be to play the entire message if the message is received during work hours and the sender is from a sender that has a professional relationship. Lastly, the recommendation may be to prioritize senders with a family or friends' relationship over senders with work relationships during non-work hours since the user consistently is skipping messages during non-work hours that contain work relationship words in the message.

In some embodiments, a communication network 140 may be a wired and/or a wireless network. The communication network 140, if wireless, may be implemented using communication techniques such as Visible Light Communication (VLC), Worldwide Interoperability for Microwave Access (WiMAX). Long Term Evolution (LTE). Wireless Local Area Network (WLAN), Infrared (IR) communication, Public Switched Telephone Network (PSTN), Radio waves, and other communication techniques known in the art. The communication network 140 may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. Furthermore, embodiments may include a 3rd party messenger server 142 which may be a server that hosts the applications or software that delivers a 3rd party messenger application 120 through a communication network 140. Further, embodiments may include an E-mail server 144 which may be a computer system that sends and receives emails from an e-mail application 118. The E-mail server 144 may be a computer application that receives incoming emails from the local users, such as users within same domain, as well as remote senders and forwards outgoing email for delivery. Furthermore, embodiments may include an SMS provider 146 which is a business entity that provides SMS messaging services 116 but is not a mobile network operator. It acts as a middleman between mobile network operators and SMS service users.

In some embodiments a vehicle 148 (e.g., a car, truck, van, etc.) may be used for transportation purposes. The vehicle 148 may include in-car entertainment or in-vehicle infotainment, which is a collection of hardware and software in automobiles that provide audio or video entertainment, and may provide a user the ability to connect their user device 102 to the vehicle 148 to use the capabilities or functionalities of the user device 102 through the in-vehicle infotainment system, such as the vehicles display, speakers, etc. Further, embodiments may include a speaker 150 which is a type of electroacoustic transducer, such as a device that converts an electrical audio signal into a corresponding sound. A speaker system comprises one or more such speaker drivers, an enclosure, and electrical connections possibly including a crossover network. The speaker driver can be viewed as a linear motor attached to a diaphragm which couples that motor's movement to motion of air, that is, sound. An audio signal, typically from a microphone, recording, or radio broadcast, is amplified electronically to a power level capable of driving that motor in order to reproduce the sound corresponding to the original unamplified electronic signal. In some embodiments, the messages received on the user device 102 may be played through the vehicle 148 speakers 150.

Functioning of the message module 124 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The message module 124 processing may begin with the message module 124 continuously polling, at step 200, for a notification. For example, the message module 124 is continuously polling for a notification from the SMS services 116, e-mail application 118, 3rd party messenger applications 120, etc. Furthermore, the messenger application 122 may receive a notification, such as a text message, e-mail, 3rd party messenger application 120 message, through the message module 124. The message module 124 receives, at step 202, a notification. For example, the message module 124 receives a notification from the SMS services 116, e-mail application 118, 3rd party messenger applications 120, etc. Furthermore, the messenger application 122 may receive a notification, such as a text message, e-mail, 3rd party messenger application 120 message, through the message module 124. The message module 124 determines, at step 204, the data from the notification. For example, the message module 124 may determine the data from the notification, such as the date the message is received, the time the message was received, the sender of the message, the sender's relationship to the user, the type of message that was received, the body of the message, create an audio file containing the data to play the message, and the length of the audio file, etc.

In some embodiments, the message module 124 may parse the message into the sender, body of the message, time received, date received, etc. In some embodiments, the message module 124 may convert the sender and body of the message to text using a speech to text conversion software to analyze the text of the message. In some embodiments, the message module 124 may use a text to speech software to create an audio file to play the message for the user. The message module 124 stores, at step 206, the notification data in the queue database 134. For example, the message module 124 may store the data in the queue database 134, such as the date the message is received, the time the message was received, the sender of the message, the sender's relationship to the user, the type of message that was received, the body of the message, create an audio file containing the data to play the message, and the length of the audio file, etc. In some embodiments, the message module 124 would return to continuously polling for a notification. In some embodiments, the message module 124 may be continuously running in the background of the messenger application 122 to consistently receive, parse the message, determine the data for the message and then store the data in the queue database 134 in order to process every message received by the messenger application 122.

Functioning of the base module 126 will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The base module 126 processing may begin with the base module 126 queries, at step 300, the queue database 134 for a new data entry. For example, the base module 126 is continuously polling the queue database 134 for a new data entry and when a new data entry is added to the database the base module 126 extracts the data entry. The base module 126 extracts, at step 302, the new entry from the queue database 134. For example, base module 126 extracts the new data entry from the queue database 134 which may include the date the message is received, the time the message was received, the sender of the message, the sender's relationship to the user, the type of message that was received, the body of the message, create an audio file containing the data to play the message, and the length of the audio file, etc. The base module 126 sends, at step 304, the extracted new entry to the queue module 128. For example, the base module 126 sends the extracted data entry from the queue database 134 to the queue module 128, which may include the date the message is received, the time the message was received, the sender of the message, the sender's relationship to the user, the type of message that was received, the body of the message, create an audio file containing the data to play the message, and the length of the audio file, etc.

The base module 126 initiates, at step 306, the queue module 128. For example, the queue module 128 begins by being initiated by the base module 126. The queue module 128 receives the data entry from the base module 126. The queue module 128 compares the data entry to the recommendation database 138. The queue module 128 extracts the playback recommendation from the recommendation database 138. The queue module 128 plays the message from the data entry based upon the playback recommendation from the recommendation database 138. The queue module 128 stores the data entry in the historical database 136. The queue module 128 stores the playback data in the historical database 136. The queue module 128 determines if there are more data entries stored in the queue database 134. If it is determined that there are more data entries in the queue database 134 the queue module 128 extracts the next data entry and the process returns to comparing the extracted data entry to the recommendation database 138. If it is determined that there are no more data entries remaining in the queue database 134 the queue module 128 returns to the base module 126. The base module 126 initiates, at step 308, the correlation module 130. For example, the correlation module 130 begins by being initiated by the base module 126. The correlation module 130 filters the historical database 136 on the sender. Then the correlation module 130 selects the first parameter in the historical database 136. The correlation module 130 performs correlations on the selected parameter and the remaining parameters to determine if the parameters are highly correlated. The correlation module 130 determines if the correlation coefficient is over the predetermined threshold, for example over a correlation coefficient of 0.75. If it is determined that the correlation coefficient is over the predetermined threshold then the correlation module 130 extracts the most reoccurring data point from the data set.

The correlation module 130 then sends the most reoccurring data point to the recommendation module 132. The correlation module 130 initiates the recommendation module 132. If it is determined that the correlation coefficient is not over the predetermined threshold or after the most reoccurring data point is sent to the recommendation module 132 the correlation module 130 determines if there are more parameters remaining in the historical database 136. If it is determined that there are more parameters remaining in the historical database 136 the correlation module 130 selects the next parameter in the historical database 136 and the process returns to performing correlations on the parameters. If it is determined that there are no more parameters remaining in the historical database 136 the correlation module 130 returns to the base module 126.

Functioning of the queue module 128 will now be explained with reference to FIG. 4. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The queue module 128 processing may begin with the queue module 128 being initiated, at step 400, by the base module 126. For example, once the base module 126 sends the extracted data entry from the queue database 134 the base module 126 sends the extracted data entry to the queue module 128 and initiates the queue module 128. The queue module 128 receives, at step 402, the data entry from the base module 126. For example, the queue module 128 receives the data entry from the base module 126, such as the date the message is received, the time the message was received, the sender of the message, the sender's relationship to the user, the type of message that was received, the body of the message, create an audio file containing the data to play the message, and the length of the audio file, etc. The queue module 128 compares, at step 404, the data entry to the recommendation database 138. For example, the queue module 128 compares the data entry to every recommendation stored in the recommendation database 138 to determine if there is a recommendation to follow based on the data from the notification. Furthermore, if the message is received during work hours, such as 9 am through 5 pm, and the sender has a professional relationship with the user the recommendation may be to play entire the message for the user. Another example may be if the sender is the user's wife, such as Jane Smith, then the recommendation may be to play the entire message for the user. Also, if the message is received during non-work hours and the sender has a professional relationship with the user then the recommendation may be to skip the message to prioritize messages from family and friend relationships over work relationships. In some embodiments, the recommendations database 138 may be structured to meet certain criteria of the data entry, such as a first criteria of a specific sender or specific relationship with the user, a second criteria of the time the message was received, and then a recommendation associated with the multiple criteria such as play entire message, skip message, play 50% of message, etc.

In some embodiments, the criteria may be created using the parameters and data points stored in the recommendation database 138, such as the parameter is the sender is Jane Smith which would be the first criteria, the first data point is the message time length and the second data point is the listen time length are highly which would mean the user listens to the entire message from sender Jane Smith, and the recommendation would be to play entire the message if the sender is Jane Smith. The queue module 128 extracts, at step 406, the playback recommendation from the recommendation database 138. For example, the queue module 128 extracts the recommendation from the recommendation database 138 that applies to the notifications data, such as if the sender is Jane Smith then play the entire message. Furthermore, if the message is received during work hours, such as 9 am through 5 pm, and the sender has a professional relationship with the user the recommendation may be to play entire the message for the user. The queue module 128 plays, at step 408, the message from the data entry based upon the playback recommendation from the recommendation database 138. For example, if the recommendation is to play the entire message from sender Jane Smith, the messenger application 122 may not allow the user to skip or pause the message since their historical behavior has been listening to the full message from sender Jane Smith. Furthermore, if the recommendation is to play the entire message from a sender with a professional relationship with the user during work hours, then the messenger application 122 may not allow the user to skip or pause the message since their historical behavior has been listening to the full message if these criteria are met. Also, if the recommendation is to skip the message, such as one received during non-work hours and the sender has a professional relationship with the user, the messenger application 122 may automatically skip the message in the queue database 134 and proceed to the next message stored in the queue database 134 since the user's historical behavior has been to skip work messages during non-work hours.

In some embodiments, the recommendations extracted may be prioritize certain messages stored in the queue database, such as work messages during work hours and family messages during non-work hours, prioritize emergency messages when they are received so that they are prioritized over all other messages, predicting when or if a user skips over a message or only listens to a percentage of a message from certain senders, senders with specific relationships, types of messages, in certain situations or times of the day, prioritize the type of message depending on when the message is received, such as prioritizing e-mails over texts messages or messages received from a 3rd party messenger application 120 during work hours or prioritizing text messages and messages received from a 3rd party messenger application 120 over e-mails during non-work hours or during weekends, etc. The queue module 128 stores, at step 410, the data entry in the historical database 136. For example, the queue module 128 stores the data entry in the historical database 136 to be processed by the correlation module 130 to further create recommendations based on the user's behavior. The data stored in the database may be the date the message is received, the time the message was received, the sender of the message, the sender's relationship to the user, the type of message that was received, the body of the message, create an audio file containing the data to play the message, and the length of the audio file, etc.

The queue module 128 stores, at step 412, the playback data in the historical database 136. For example, there may be data collected from when the user plays the received message and this data is stored in the historical database 136 along with the extracted data entry data that was previously stored in step 410. Furthermore, the playback data stored in the historical database 136 may be the listen time of the message, the percentage of the message that was listened to by the user, the number of relationship words contained in the message, the number of times the message was skipped, the time elapsed between the message being received and the time the message was played by the user, etc. The queue module 128 determines, at step 414, if there are more data entries stored in the queue database 134. For example, the queue module 128 determines if there are data entries in the queue database 134 and will extract them to determine if there are any recommendations for the data entry. In some embodiments, the message module 124 is continuously running in the background of the messenger application 122 and newly received messages may be added to the queue database 134 while the queue module 128 is running simultaneously. If it is determined that there are more data entries in the queue database 134 the queue module 128 extracts, at step 416, the next data entry and the process returns to comparing the extracted data entry to the recommendation database 138. If it is determined that there are no more data entries remaining in the queue database 134 the queue module 128 returns, at step 418, to the base module 126.

Functioning of the correlation module 130 will now be explained with reference to FIG. 5. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The correlation module 130 processing may begin with the correlation module 130 being initiated, at step 500, by the base module 126. The correlation module 130 filters, at step 502, the historical database 136 based on the sender. For example, the correlation module 130 filters the historical database on the sender, such as Jane Smith. In some embodiments, the historical database 136 may be filtered on other parameters such as the date the message is received, the time the message was received, the sender's relationship to the user, the type of message that was received, the body of the message, an audio file containing the data to play the message, the length of the audio file, the listen time of the message, the percentage of the message that was listened to by the user, the number of relationship words contained in the message, the number of times the message was skipped, the time elapsed between the message being received, the time the message was played by the user, etc. Then the correlation module 130 selects, at step 504, the first parameter in the historical database 136. The correlation module 130 may select the first parameter in the historical database 136, for example, if the historical database 136 is filtered on the sender, such as Jane Smith, the first parameter selected may be the message time or the length of the audio file, and then correlations would be performed using all the other parameter stored in the historical database 136.

The correlation module 130 performs, at step 506, correlations on the selected parameter and the remaining parameters to determine if the parameters are highly correlated. For example, with the historical database 136 filtered on the sender, such as Jane Smith and the first parameter, such as the message time length, the correlation module 130 performs correlations on the other parameters in the historical database 136, such as the date the message is received, the time the message was received, the sender's relationship to the user, the type of message that was received, the body of the message, an audio file containing the data to play the message, the length of the audio file, the listen time of the message, the percentage of the message that was listened to by the user, the number of relationship words contained in the message, the number of times the message was skipped, the time elapsed between the message being received, the time the message was played by the user, etc. An example of highly correlated data may be the message time and the listen time, such as the amount of time it takes to play the message is highly correlated with the time the user listens to the message, with a correlation coefficient of 0.98. The most re-occurring data point in the correlated data would be extracted, such as the message time of 10 seconds and the listen time of the message is 10 seconds would be sent to the recommendation module 132 along with the correlation coefficient of 0.98. Another example of highly correlated data may be if the historical database 136 is filtered on work hours and the parameters of relationship related words, such as professional words, and listen time, such as the amount of time the user listens to the message, with a correlation coefficient of 0.95. An example of data that is not highly correlated may be if the historical database 136 is filtered on non-work days, such as the weekends, and the parameters of work relationship words contained in the message and the listen time of the message, such as there is no trend for the amount of time a user listens to a work message during the weekends, with a correlation coefficient of 0.60. In this example the correlation coefficient does not exceed the predetermined threshold, so the next parameter is selected, and correlations are performed again on the newly selected parameter.

In some embodiments, the correlation module 130 may use supervised machine learning to find closely related historical behavioral data, such as similar behaviors with specific senders at certain times or with certain types of messages and store the data in the recommendation database 138. For example, supervised machine learning algorithms can use data that has already been analyzed, by a person or another algorithm, to classify new data. Analyzing a known training dataset allows a supervised machine learning algorithm to produce an inferred function to predict output values in the new data. As input data is fed into the model, it changes the weighting of characteristics until the model is fitted appropriately. This supervised learning is part of a process to ensure that the model avoids overfitting or underfitting called cross-validation. Supervised learning helps organizations solve various real-world problems at scale. Supervised machine learning algorithms are adept at dividing data into two categories, or binary classification, choosing between more than two types of answers, or multi-class classification, predicting continuous values, or regression modeling, or combining the predictions of multiple machine learning models to produce an accurate prediction, also known as ensembling. Some methods used in supervised learning include neural networks, naïve Bayes, linear regression, logistic regression, random forest, support vector machine (SVM), and more. A supervised machine learning may be provided a dataset of historical behaviors, the data from the messages, and the associated playback data from the user and use that data to identify a current user's behavior depending on the message received. In some embodiments, the supervised machine learning may identify user's behavior, trends, traits, etc. that the user displays over time and send the data to the recommendation module 132 to create a recommendation based on the correlated data.

The correlation module 130 determines, at step 508, if the correlation coefficient is over the predetermined threshold, for example over a correlation coefficient of 0.75. For example, the threshold may be set by the user to separate the highly correlated data from the data that is not highly correlated and deemed not significant. Furthermore, the predetermined threshold may set by the messenger application 122 in which the correlation coefficients must exceed the predetermined threshold in order to be deemed significant and can be used to determine recommendations based on the data points that were highly correlated. If it is determined that the correlation coefficient is over the predetermined threshold then the correlation module 130 extracts, at step 510, the most reoccurring data point from the data set. For example, if the parameter was the sender, such as Jane Smith, and the data points that were highly correlated were the message time and the listen time, and the correlation coefficient was 0.98, then the parameter and the data points would be sent to the recommendation module 132. Furthermore, the most reoccurring data point may be that sender Jane Smith sends a message that is 10 seconds long and the user listens to the message for the full 10 seconds. In some embodiments, the data points that are sent to the recommendation module 132 may be the parameter and the categories for the x-axis and y-axis from the correlations, such as a parameter of Jane Smith and the categories message time and listen time. The correlation module 130 then sends, at step 512, the most reoccurring data point to the recommendation module 132. For example, if the correlation coefficient is above the threshold and deemed highly relevant then the parameter and the data points would be sent to the recommendation module 132. Furthermore, the most reoccurring data point may be that sender Jane Smith sends a message that is 10 seconds long and the user listens to the message for the full 10 seconds. In some embodiments, the data points that are sent to the recommendation module 132 may be the parameter and the categories for the x-axis and y-axis from the correlations, such as a parameter of Jane Smith and the categories message time and listen time.

The correlation module 130 initiates, at step 514, the recommendation module 132. For example, the recommendation module 132 is continuously polling to receive the parameters, most reoccurring data points, and the correlation coefficients, creates a recommendation based on the received data, stores all the data and the recommendation in the recommendation database 138 and returns continuously polling to receive more data to create more recommendations. If it is determined that the correlation coefficient is not over the predetermined threshold or after the most reoccurring data point is sent to the recommendation module 132 the correlation module 130 determines, at step 516, if there are more parameters remaining in the historical database 136. If it is determined that there are more parameters remaining in the historical database 136 the correlation module 130 selects, at step 518, the next parameter in the historical database 136 and the process returns to performing correlations on the parameters. If it is determined that there are no more parameters remaining in the historical database 136 the correlation module 130 returns, at step 520, to the base module 126.

Functioning of the recommendation module 132 will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The recommendation module 132 processing may begin with the recommendation module 132 continuously polling, at step 600, for the data points from the correlation module 130. For example, if the correlation coefficient is above the threshold and deemed highly relevant then the parameter and the data points would be sent to the recommendation module 132. Furthermore, the most reoccurring data point may be that sender Jane Smith sends a message that is 10 seconds long and the user listens to the message for the full 10 seconds. In some embodiments, the data points that are sent to the recommendation module 132 may be the parameter and the categories for the x-axis and y-axis from the correlations, such as a parameter of Jane Smith and the categories message time and listen time. In some embodiments, the recommendation module 132 may be continuously running in the background of the messenger application 122 and waits to receive the data points and parameters from the correlation module 130, which once received initiates the process of the recommendation module 132. The recommendation module 132 receives, at step 602, the data points from the correlation module 130. For example, the recommendation module 132 receives the data points from the correlation module 130, such as the most reoccurring data point may be that sender Jane Smith sends a message that is 10 seconds long and the user listens to the message for the full 10 seconds. In some embodiments, the data points that are sent to the recommendation module 132 may be the parameter and the categories for the x-axis and y-axis from the correlations, such as a parameter of Jane Smith and the categories message time and listen time. The recommendation module 132 creates, at step 604, a recommendation based upon the received data points. In some embodiments, the data points may be the most reoccurring data points in the correlated data set to determine the recommendation. In some embodiments, the data points may be used to create the recommendations, such as if the user consistently listens to the entire message from their wife, such as a Jane Smith, the recommendation would be to play the entire message if the sender is Jane Smith. Also, if the message is received during work hours, such as 9 am through 5 μm, and the user consistently listens to the entire message if the message contains work relationship words the recommendation may be to play the entire message if the message is received during work hours and the sender is from a sender that has a professional relationship. Lastly, the recommendation may prioritize senders with a family or friends' relationship over senders with work relationships during non-work hours since the user consistently is skipping messages during non-work hours that contain work relationship words in the message.

The recommendation module 132 stores, at step 606, the created recommendation in the recommendation database 138. For example, the database contains the received parameter and the first and second data point, the correlation coefficient of the data points, and the created recommendation. In some embodiments, the data points may be the most reoccurring data points in the correlated data set to determine the recommendation. In some embodiments, the data points may be used to create the recommendations, such as if the user consistently listens to the entire message from their wife, such as a Jane Smith, the recommendation would be to play the entire message if the sender is Jane Smith. Also, if the message is received during work hours, such as 9 am through 5 pm, and the user consistently listens to the entire message if the message contains work relationship words the recommendation may be to play the entire message if the message is received during work hours and the sender is from a sender that has a professional relationship. Lastly, the recommendation may be to prioritize senders with a family or friends' relationship over senders with work relationships during non-work hours since the user consistently is skipping messages during non-work hours that contain work relationship words in the message.

In some embodiments, the recommendations database 138 may be structured to meet certain criteria of the data entry, such as a first criteria of a specific sender or specific relationship with the user, a second criteria of the time the message was received, and then a recommendation associated with the multiple criteria such as play entire message, skip message, play 50% of message, etc. In some embodiments, the criteria may be created using the parameters and data points stored in the recommendation database 138, such as the parameter is the sender is Jane Smith which would be the first criteria, the first data point is the message time length and the second data point is the listen time length are highly which would mean the user listens to the entire message from sender Jane Smith, and the recommendation would be to play entire the message if the sender is Jane Smith. In some embodiments, once the recommendation module 132 stores the recommendation in the recommendation database 138 the recommendation module 132 returns to continuously polling to receive the data from the correlation module 132 to create more recommendations for the received messages.

Functioning of the queue database 134 will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The queue database 134 may contain the messages or notifications in queue to be played by the messenger application 122 for the user. The database 134 may be created through the process described in the message module 124 in which once the message is received by the messenger application 122 the message module 124 collects and determines the data about the message and stores the data in the queue database 134. The database 134 may contain the date the message is received, the time the message was received, the sender of the message, the sender's relationship to the user, the type of message that was received, the body of the message, an audio file containing the data to play the message, and the length of the audio file. In some embodiments, the queue database 134 may be updated by the queue module 128 based on a recommendation extracted from the recommendation database 138, such as giving a message a lower or higher priority over other messages, placing the message data entry in a lower or higher position in the queue database 134, skipping a message to get to another message, prioritizing specific senders or senders with specific relationships to the user depending on the current time.

Functioning of the historical database 136 will now be explained with reference to FIG. 7. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The historical database 136 may be created in the process described in the queue module 128 in which the data extracted from the queue database 134 and the data collected from the user's playback of the message are stored in the historical database 136. The database 136 may be used in the correlation module 130 to determine if there are correlations between the various parameters and if so, the correlated parameters are used by the recommendation module 132 to create recommendations for future messages that are received by the messenger application 122. The database 136 may contain the date the message is received, the time the message was received, the sender of the message, the sender's relationship to the user, the type of message that was received, the body of the message, an audio file containing the data to play the message, the length of the audio file, the listen time of the message, the percentage of the message that was listened to by the user, the number of relationship words contained in the message, the number of times the message was skipped, the time elapsed between the message being received and the time the message was played by the user. In some embodiments, the relationship words may be determined by comparing to the body of the message to a database that contains specific words related to the sender's relationship to the user, such as a family relationship, professional or work relationship, friend relationship, etc. For example, relationship words for a family relationship may be brother, sister, husband, wife, mother, father, daughter, son, grandfather, grandmother, grandfather, mother in law, father in law, etc. Also, family relationship words may be specific words normally used by a family member, such as dinner, supper, homework, school, home, lessons, appointment, babysitter, etc. For example, work relationship words may be client, project, schedule, meeting, boss, supervisor, employee, subordinate, assistant, discuss, plan, conference, deadline, invoice, etc. In some embodiments, the work relationship words may be related to the type of employment for the user, for example, there may be specific words typically used by certain professions, such as doctor, nurse, or healthcare workers, lawyers, salespersons, marketing specialists, etc. For example, the friend relationship words may be double date, dinner, party, open house, get to together, game night, etc. In some embodiments, the relationship words may be selected by the user or the messenger application may have a generic database that can be used in order to determine the usage of relationship words.

Functioning of the recommendation database 138 will now be explained with reference to FIG. 8. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The recommendation database 138 may be created in the process described in the recommendation module 132 in which the recommendation module 132 uses the received data points and filtered parameter to determine a recommendation that will be used during the process described in the queue module 128 for incoming messages received by the messenger application 122. The database 138 may contain the received parameter and the first and second data point, the correlation coefficient of the data points, and the created recommendation. In some embodiments, the data points may be the most reoccurring data points in the correlated data set to determine the recommendation. In some embodiments, the data points may be used to create the recommendations, such as if the user consistently listens to the entire message from their wife, such as a Jane Smith, the recommendation would be to play the entire message if the sender is Jane Smith. Also, if the message is received during work hours, such as 9 am through 5 μm, and the user consistently listens to the entire message if the message contains work relationship words the recommendation may be to play the entire message if the message is received during work hours and the sender is from a sender that has a professional relationship. Lastly, the recommendation may be to prioritize senders with a family or friends' relationship over senders with work relationships during non-work hours since the user consistently is skipping messages during non-work hours that contain work relationship words in the message. In some embodiments, the recommendations database 138 may be structured to meet certain criteria of the data entry, such as a first criteria of a specific sender or specific relationship with the user, a second criteria of the time the message was received, and then a recommendation associated with the multiple criteria such as play entire message, skip message, play 50% of message, etc. In some embodiments, the criteria may be created using the parameters and data points stored in the recommendation database 138, such as the parameter is the sender is Jane Smith which would be the first criteria, the first data point is the message time length and the second data point is the listen time length are highly which would mean the user listens to the entire message from sender Jane Smith, and the recommendation would be to play entire the message if the sender is Jane Smith.

The functions performed in the processes and methods may be implemented in differing, order. Furthermore, the outlined steps and operations are only provided as examples; and some of the steps and operations may be optional, combined into fewer steps and operations, or expanded into additional, steps and operations without detracting from the essence of the disclosed embodiments,

What is claimed is:

1. A method for playback of messages based on user behavior, comprising:
   filtering historical data associated with messages received by a user of an electronic device based on a first parameter of the historical data; wherein the historical data comprises message parameters and playback parameters;
   selecting a second parameter from the filtered historical data;
   comparing the second parameter to all other parameters of the filtered historical data;
   determining a respective correlation coefficient for the second parameter with respect to each of the other parameters of the historical data based on the comparing;
   selecting a third parameter from the filtered historical data based on the respective correlation coefficients;
   extracting data points associated with the second and third parameters from the filtered historical data; and
   generating a recommendation for playback of a message based on the first, second and third parameters, and the extracted data points;
   wherein generating the recommendation for playback of the message comprises providing the first, second and third parameters, and the extracted data points to a trained machine learning model as input and receiving the recommendation as an output of the machine learning model.

2. The method of claim 1, wherein the message parameters comprise at least one of a sender of the message, the sender's relationship to the user, a content of the message, a length of the message, a type of the message, a date the message was received by the electronic device, or a time the message was received by the electronic device.

3. The method of claim 2, wherein the message type comprises at least one of an email, a voicemail, a text message, a voice message, or a video message.

4. The method of claim 1, wherein the playback parameters comprise at least one of a listen time of the message, a percentage of the message that was listened to by the user, a number of times the message was skipped, a time elapsed between the message being received or the message being played by the user.

5. The method of claim 1, wherein the content of the message comprises at least one of words contained in the message, images contained in the message, or emoticons contained in the message.

6. The method of claim 1, wherein the electronic device comprises at least one of a smart phone, a smart watch, a personal computer, a tablet computer, a vehicle, or a home appliance.

7. The method of claim 1, wherein the selecting of a third parameter from the filtered historical data based on the respective correlation coefficients comprises determining if the respective correlation coefficient associated with the third parameter is greater than a specified threshold value.

8. The method of claim 1, wherein the extracted data points comprise the most reoccurring data points in the historical data.

9. The method of claim 1, further comprising training the machine learning model by:
inputting training data that has already been analyzed and associated with specified message playback recommendations;
receiving output from the machine learning model comprising predicted message playback recommendations based on the training data; and
modifying weights associated with the machine learning model based on comparing the predicted message playback recommendations to the specified message playback recommendations.

10. A system for playback of messages based on user behavior, comprising:
a device comprising: a correlation module to:
filter historical data associated with messages received by a user of an electronic device based on a first parameter of the historical data;
wherein the historical data comprises message parameters and playback parameters; select a second parameter from the filtered historical data;
compare the second parameter to all other parameters of the filtered historical data;
determine a respective correlation coefficient for the second parameter with respect to each of the other parameters of the historical data based on the comparing;
select a third parameter from the filtered historical data based on the respective correlation coefficients;
extract data points associated with the second and third parameters from the filtered historical data; and
a recommendation module to: generate a recommendation for playback of a message based on the first, second and third parameters, and the extracted data points;
wherein generating the recommendation for playback of the message comprises providing the first, second and third parameters, and the extracted data points to a trained machine learning model as input and receiving the recommendation as an output of the machine learning model.

11. The system of claim 10, wherein the message parameters comprise at least one of a sender of the message, the sender's relationship to the user, a content of the message, a length of the message, a type of the message, a date the message was received by the electronic device, or a time the message was received by the electronic device.

12. The system of claim 11, wherein the message type comprises at least one of an email, a voicemail, a text message, a voice message, or a video message.

13. The system of claim 10, wherein the playback parameters comprise at least one of a listen time of the message, a percentage of the message that was listened to by the user, a number of times the message was skipped, a time elapsed between the message being received or the message being played by the user.

14. The system of claim 10, wherein the content of the message comprises at least one of words contained in the message, images contained in the message, or emoticons contained in the message.

15. The system of claim 10, wherein the electronic device comprises at least one of a smart phone, a smart watch, a personal computer, a tablet computer, a vehicle, or a home appliance.

16. The system of claim 10, wherein the correlation module is further to:
select a third parameter from the filtered historical data based on the respective correlation coefficients by determining if the respective correlation coefficient associated with the third parameter is greater than a specified threshold value.

17. The system of claim 10, wherein the extracted data points comprise the most reoccurring data points in the historical data.

18. The system of claim 10, wherein the machine learning model is configured to:
receive, as input, training data that has already been analyzed and associated with specified message playback recommendations; and
output predicted message playback recommendations based on the training data, wherein weights associated with the machine learning model are modified based on a comparison of the predicted message playback recommendations to the specified message playback recommendations.

* * * * *